A. L. KERN.
STUMP PULLER.
APPLICATION FILED MAY 22, 1914.
1,126,227.
Patented Jan. 26, 1915.
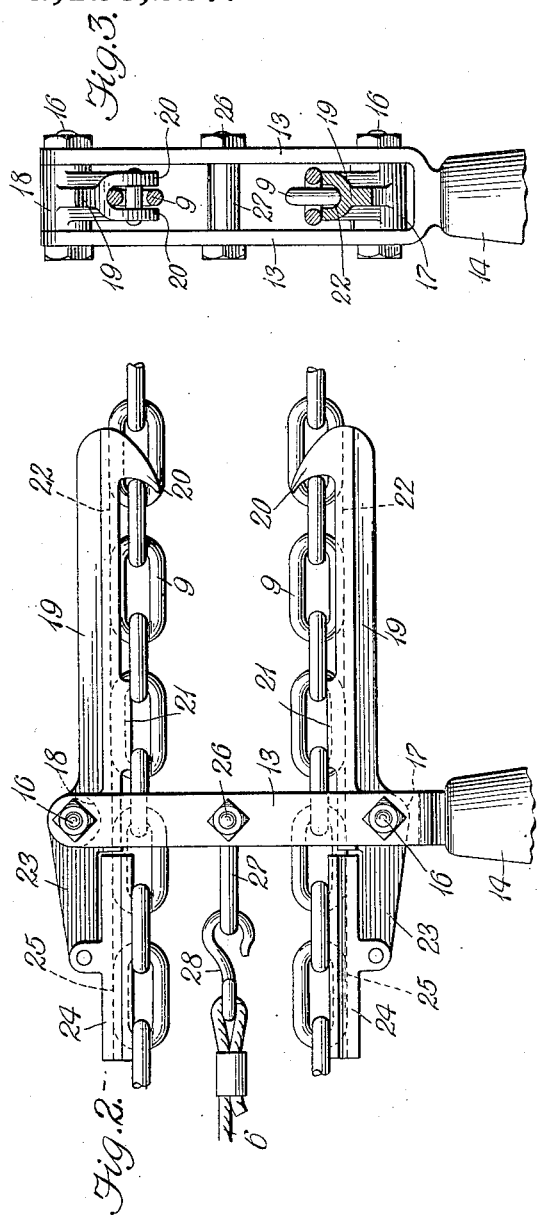
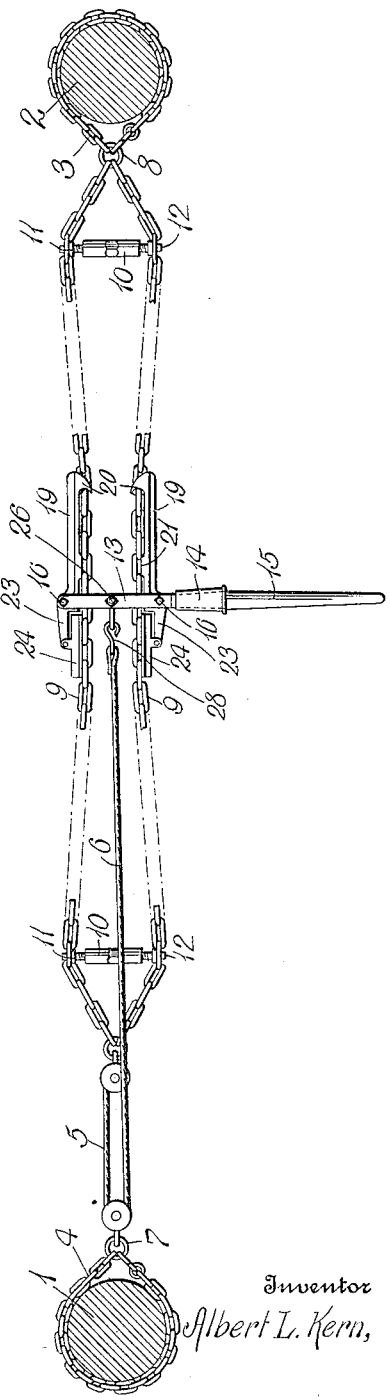
Witnesses
Chas. W. Stauffiger
G. E. McKram
Inventor
Albert L. Kern,
By
Bartlett & Bartlett
Attorneys

UNITED STATES PATENT OFFICE.

ALBERT L. KERN, OF DETROIT, MICHIGAN.

STUMP-PULLER.

1,126,227.

Specification of Letters Patent.

Patented Jan. 26, 1915.

Application filed May 22, 1914. Serial No. 840,165.

*To all whom it may concern:*

Be it known that I, ALBERT L. KERN, a citizen of the United States of America, residing at Detroit, in the county of Wayne and State of Michigan, have invented certain new and useful Improvements in Stump-Pullers, of which the following is a specification, reference being had therein to the accompanying drawings.

This invention relates to a stump pulling device adapted to be manually operated, and my invention aims to provide a simple, durable and inexpensive device by which an enormous pulling strain can be exerted upon a stump or other object to be displaced with relatively little effort upon the part of the operator.

My invention further aims to provide a device of the above type consisting of comparatively few parts that can be easily and quickly placed in position to pull a stump or move an object relatively to a suitable anchor, which, in this particular instance, may be an adjacent stump or tree.

The device includes stump chains or connections, a block and tackle, a chain rack and an oscillatory gripping device that is arranged upon the chain rack to be intermittently advanced thereon to apply power to the block and tackle whereby a stump or object to which the device is connected can be easily and quickly extracted or pulled.

My invention further aims to accomplish the above and other results by a mechanical construction that will be hereinafter specifically described and then claimed, and reference will now be had to the drawing, wherein—

Figure 1 is a plan of the device in position for operation; Fig. 2 is an enlarged plan of the oscillatory gripping device, and Fig. 3 is a side elevation of the same.

In the drawing, 1 denotes, by the way of an example, a firmly rooted stump or tree which serves functionally as an anchor for the device, and 2 denotes a stump or object to be pulled or extracted from the ground.

Suitably connected to the stumps 1 and 2, preferably by encircling the stump, are chains 3 and 4, although ropes or other devices can be used for connecting the stump puller to the stumps 1 and 2. Connected to the chain 4 is a conventional form of block and tackle 5 having a power rope or cable 6. Connected to the block and tackle 5, as at 7, is one end of a chain rack, which has the opposite end thereof connected, as at 8, to the chain 3. The chain rack comprises two parallel chains 9, said chains having the ends thereof maintained apart by adjustable spreaders 10 in the form of turnbuckles that have the ends thereof provided with heads 11 engaging the chains 9 and pins 12 extending through links of said chains.

Arranged upon the chain rack is an oscillatory gripping device, comprising a yoke 13 having the closed end thereof provided with a socket 14 for a handle or lever 15. Fulcrumed or pivotally mounted between the arms of the yoke 13 by pins 16 are gripping members 17 and 18, the former being in proximity to the socket 14 and the latter at the outer end of the yoke. The gripping members 17 and 18 are identical in construction, each comprising a hook 19 having a bifurcated bill 20 adapted to embrace a link of the chain 9 and extend between companion links, as best shown in Fig. 2. The hook 19 has a guard or guide member 21 and said hook is longitudinally grooved throughout its length, as at 22, to provide clearance for a series of links, one of which is embraced by the guard or guide member 21 while the bill of the hook embraces another link. The guard or guide member is of a sufficient length and spaced from the bill of the hook to prevent the bill from entering the opening of a link, besides firmly bracing the hook 19 relatively to the chain rack when the yoke 13 is shifted to advance one or the other of the hooks 19.

The opposite ends of the gripping members 17 and 18 are off-set, as at 23 and provided with pivoted shoes 24, said shoes being longitudinally grooved, as at 25, to provide clearance for a series of links contiguous to the yoke 13. The shoes 24 are of sufficient length to span the gap between two links and therefore readily ride upon the links of the chain when the oscillatory gripping device is advanced upon the chain rack.

The yoke 13, intermediate the ends thereof, has the arms connected by a bolt or pin 26 supporting a loop or clevis 27 to which is attached a hook 28 carried by the power rope or cable 6 of the block and tackle 5.

To operate the device, it is set up in the position shown in Fig. 1, but with the oscillatory gripping device at the end of the chain rack contiguous to the stump or tree 1, which serves as an anchor. The lever or handle 15 is then oscillated in a horizontal plane, the gripping member 17 first serving as a fulcrum for the yoke 13 and then the other gripping member 18, or vice versa. In this manner the members 17 and 18 alternately act as fulcrums for the yoke 13, and when one member serves to fulcrum the yoke, the other member is advanced to obtain a fresh or new grip upon one of the chains of the rack. This operation is continued until the oscillatory gripping device has moved from one end of the chain rack to the opposite end, and in the meantime, the stump 2 has been partially extracted from the ground, if not entirely so, such extraction depending upon the length of the chain rack. Should it be found necessary to repeat the operation, the oscillatory gripping device is restored to its normal position, slack taken up in the power rope or cable 6, and then the operation continued.

The operation of restoring the gripping device to its normal position is an exceedingly easy one, as in the majority of instances, the gripping device can be slipped along the chain, but should there not be sufficient slack in the power cable of the block and tackle, the gripping members can be gripped in the hand and shifted along the chain.

I attach considerable importance to the flexible rack and the manner in which the chains are held, as it is impossible for the chains to twist and incorrectly position the links, which would undoubtedly retard the action of the gripping device. By maintaining the links in proper position and relation, the gripping device can be expeditiously advanced upon the rack with a uniform tension. By eliminating a yieldable or spring action on the part of the gripping device, said device can be operated with ease and without any danger of the device slipping during operation, as the gripping members positively engage the chains of the rack and it is possible for an operator to maintain the entire device taut while an examination is made of a partially extracted stump. I also attach considerable importance to the fact that the rack upon which the oscillatory gripping device is operated is flexible, thereby permitting of said rack and its appurtenant parts being easily carried, and together with the gripping device and detachable lever, packed in a suitable case.

From the foregoing it will be observed that I have devised a novel power device that can be used for various purposes, for instance, as a part of an automobile kit, whereby automobiles or other vehicles could be withdrawn from ruts, holes and over such obstructions that would ordinarily interfere with the movement of the vehicle.

It is thought the operation and utility of the stump pulling device will be apparent without further description, and while in the drawing there is illustrated a preferred embodiment of the invention, it is to be understood that the structural elements are susceptible to such changes, as in the size, shape and manner of assemblage, as fall within the scope of the appended claims.

What I claim is:

1. A stump pulling device comprising a flexible double chain rack adapted to have an end thereof connected to the stump to be pulled, a block and tackle connected to the opposite end of said rack and adapted to be suitably anchored, gripping members engaging said rack, shoes connected to said members, and means embracing said rack members, and connected to said members and to the power rope of said block and tackle adapted to alternately advance said gripping members upon the chains of said rack and thereby operate said block and tackle.

2. In a stump pulling device, the combination with an anchored block and tackle, of a flexible double chain rack connecting the block and tackle with the stump to be pulled, an oscillatory gripping device movable longitudinally of said rack and connected to the power rope of said block and tackle, gripping members forming part of said oscillatory gripping device and adapted to alternately serve as fulcrums for said device, and shoes connected to said members and engaging the chains of said rack.

3. In a stump pulling device, chains adapted to be connected to a stump to be pulled, a block and tackle connected to said chains and adapted to be anchored at a point remote from the stump to be pulled, adjustable spreaders arranged between said chains, gripping members engaging upon said chains, a yoke supporting said members and connected to the power rope of said block and tackle and adapted to be advanced upon said chains, and shoes pivotally connected to said members and engaging said chain.

4. In a power device, parallel chains adapted to have an end thereof connected to an object to be moved, a block and tackle connected to said chain and a suitable anchor, an oscillatory gripping device adapted to be connected to the power rope of said block and tackle and advanced upon said chains, and means between said chains causing said chains to exert a constant pressure against said gripping device.

In testimony whereof I affix my signature in presence of two witnesses.

ALBERT L. KERN.

Witnesses:
ANNA M. DORR,
KARL H. BUTLER.